US008700417B2

United States Patent
Zhang et al.

(10) Patent No.: US 8,700,417 B2
(45) Date of Patent: Apr. 15, 2014

(54) PARTITIONING A NETWORK INTO SUB-NETWORKS BASED ON USER UTILITY

(75) Inventors: Zhengjie Zhang, Covington, WA (US); Richard Lonsdale, Vancouver, CA (US); Fredrick W. Ervin, Maple Valley, WA (US); Roger A. Parker, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 1426 days.

(21) Appl. No.: 12/130,177

(22) Filed: May 30, 2008

(65) Prior Publication Data

US 2008/0301159 A1 Dec. 4, 2008

Related U.S. Application Data

(60) Provisional application No. 60/924,786, filed on May 31, 2007.

(51) Int. Cl.
*G06F 17/30* (2006.01)
(52) U.S. Cl.
USPC .......................................... 705/1.1

(58) Field of Classification Search
USPC ......................................... 707/999.1; 705/1.1
See application file for complete search history.

(56) References Cited

U.S. PATENT DOCUMENTS

| 2004/0071082 A1* | 4/2004 | Basu et al. ...................... 370/229 |
| 2006/0095306 A1* | 5/2006 | Parker et al. ...................... 705/7 |
| 2006/0293834 A1* | 12/2006 | Parker et al. ................... 701/117 |
| 2008/0140465 A1 | 6/2008 | de Marcken |

OTHER PUBLICATIONS

Article entitled "Application of a Probabilistic Decision Model to Airline Seat Inventory Control" by Belobaba dated Apr. 1989.*
Article entitled "Airline System Simulation" by Gunn dated Apr. 1964.*

* cited by examiner

*Primary Examiner* — Mahesh Dwivedi

(57) ABSTRACT

To perform a query, a set of nodes for an origin is loaded, it is determined if a node is a destination for each node of the set of nodes, and a path is recorded in response to the node being the destination. A hypothetical path is generated in response to the node not being the destination, it is determined if the hypothetical path exceeds a stopping rule, and the hypothetical path is recorded in response to the hypothetical path not exceeding the stopping rule.

10 Claims, 6 Drawing Sheets

PARTITIONING A NETWORK INTO SUB-NETWORKS BASED ON USER UTILITY

CROSS REFERENCE TO RELATED APPLICATIONS

This application claims priority to U.S. Provisional Application Ser. No. 60/924,786, filed on May 31, 2007, titled "PARTITIONING A NETWORK INTO SUB-NETWORKS BASED ON USER UTILITY," the disclosure of which is incorporated herein by reference in its entirety.

TECHNICAL FIELD

The present disclosure generally relates to a query of a relatively large database into a set of queries of relatively smaller databases. More particularly, the disclosure pertains to a method and system that partitions a network into sub-networks based on user utility.

BACKGROUND

Generally, database queries fall into two categories. The first category is relatively easy searches such as finding a name or number in a telephone directory. The second category is the relatively difficult problem of finding a "best" solution from a number of possibilities. The classic example of this latter category is the traveling salesman problem, e.g., finding the best path through a sales area that maximizes the number of cities visited while minimizing the distance traveled. The "brute force" solution is to identify all possible routes and then to compare each one to all the others. Unfortunately, the complexity and time required to solve the problem increases exponentially as the number of possible destinations increases.

In the airline industry, determining a set of viable itineraries to present to a passenger is a relatively difficult problem. Typically, the passenger or travel agent performing a query expects to receive an answer quickly. To perform the query, flight databases are checked for flight times and destinations to determine an itinerary. Generally, flight plans with the fewest number of stops and the lowest cost are preferred. If layovers are required, shorter layovers are typically preferred over longer layovers.

Accordingly, it is desirable to provide an efficient system and method for performing user queries of a database that is capable of overcoming the disadvantages described herein at least to some extent.

SUMMARY

The foregoing needs are met, to a great extent, by the present disclosure, wherein in one respect a system and method is provided that in some embodiments improves the performance of user queries to a database.

An embodiment relates to a method of generating a reduced dataset in a hierarchical database. In this method a set of nodes for an origin are loaded and a first node of the set of nodes is compared to a destination. The first node includes a first branching structure of subsequent nodes in the hierarchical database. In addition, a path is stored to the reduced dataset in response to the first node being the destination, a hypothetical path is generated in response to the first node not being the destination, and the hypothetical path is compared to a stopping rule. Furthermore, the hypothetical path is stored to the reduced dataset in response to the hypothetical path exceeding a predetermined low value and analysis of subsequent nodes of the first branching structure is stopped in response to the hypothetical path being less than the predetermined low value.

Another embodiment pertains to a method of identifying a potentially valuable city pair market for airline service. In this method, a set of nodes for an origin in a hierarchical database is loaded and a first node of the set of nodes is compared to a destination. The first node includes a first branching structure of subsequent nodes in the hierarchical database. In addition, a hypothetical path is generated in response to the first node not being the destination, the hypothetical path is compared to a stopping rule, and the hypothetical path is stored to a list of potentially valuable city pairs in response to the hypothetical path exceeding a predetermined low value.

Yet another embodiment relates to an apparatus for generating a reduced dataset in a hierarchical database. The apparatus includes a means for loading a set of nodes for an origin and means for comparing a first node of the set of nodes to a destination. The first node includes a first branching structure of subsequent nodes in the hierarchical database. In addition, the apparatus includes a means for storing a path to the reduced dataset in response to the first node being the destination, means for generating a hypothetical path in response to the first node not being the destination, and means for comparing the hypothetical path to a stopping rule. The apparatus further includes a means for storing the hypothetical path to the reduced dataset in response to the hypothetical path exceeding a predetermined low value and means for stopping analysis of subsequent nodes of the first branching structure in response to the hypothetical path being less than the predetermined low value.

Yet again another embodiment pertains to an apparatus for identifying a potentially valuable city pair market for airline service. The apparatus includes a means for loading a set of nodes for an origin in a hierarchical database and means for comparing a first node of the set of nodes to a destination. The first node includes a first branching structure of subsequent nodes in the hierarchical database. The apparatus additionally include a means for generating a hypothetical path in response to the first node not being the destination, means for comparing the hypothetical path to a stopping rule, and means for storing the hypothetical path to a list of potentially valuable city pairs in response to the hypothetical path exceeding a predetermined low value.

There has thus been outlined, rather broadly, certain embodiments that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that embodiments are not limited in its application to the details of construction and to the arrangements of the components set forth in the following description or illustrated in the drawings. In addition to the embodiments described, the various embodiments are capable of being practiced and carried out in various ways. Also, it is to be understood that the phraseology and terminology employed herein as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be

DETAILED DESCRIPTION OF THE PREFERRED EMBODIMENT

Figure 1:
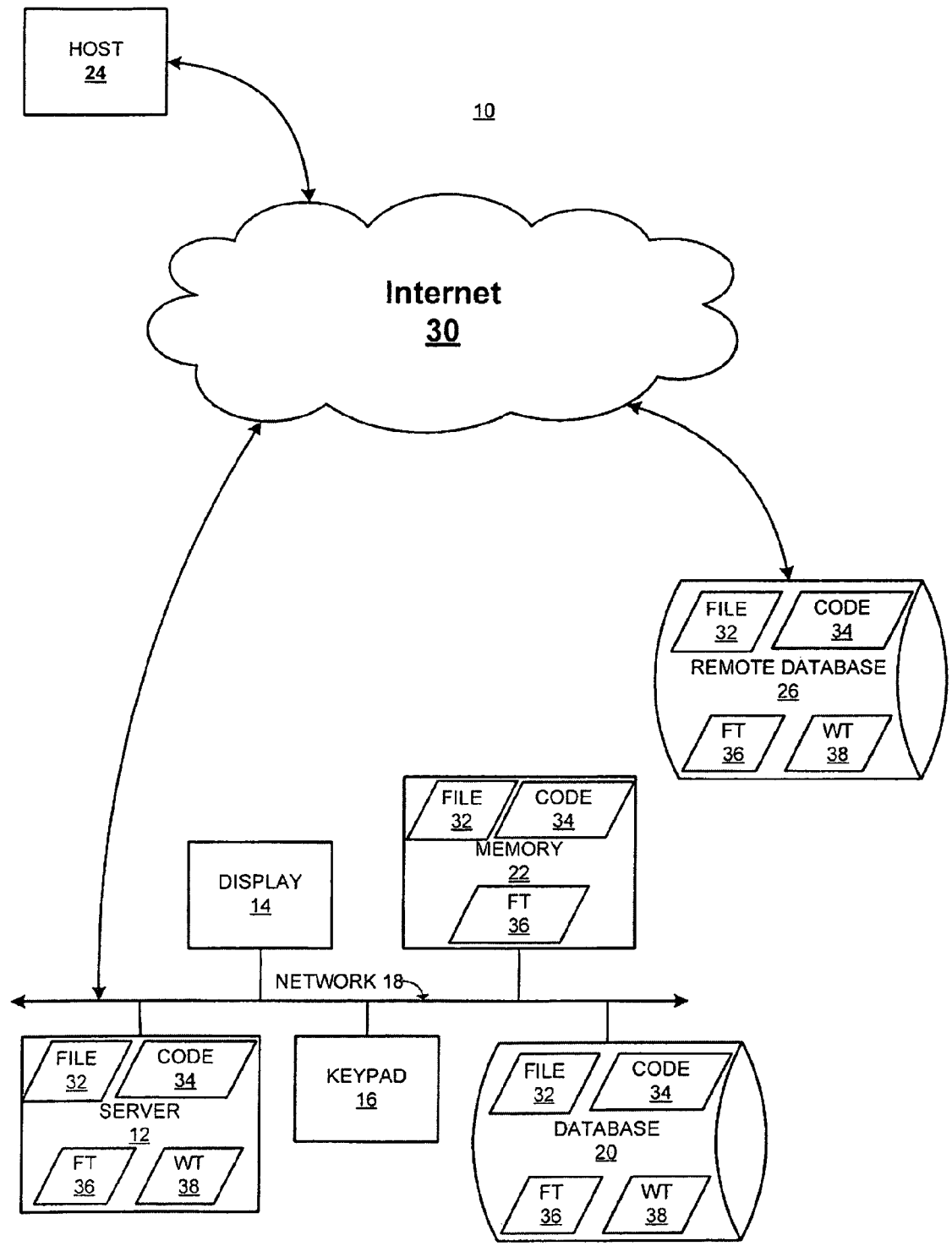
FIG. 1 is a block diagram of a system architecture for a passenger flight scheduling system according to an embodiment.

Various embodiments will now be described with reference to the drawing figures, in which like reference numerals refer to like parts throughout. In determining an appropriate airplane to offer to customer airlines, it is advantageous to allocate the passenger demand to the available itineraries, or paths, that connect the origin-destination city pair markets served by that airline. Very often in the analysis of potential changes to an airline's service network, a base case representing the current allocation situation is utilized as a starting point. Changes to the base case may be modified in response to testing new aircraft fleets and modifying schedules. Such changes have effects throughout the network. Understanding these effects facilitates a full appreciation of the impact of a proposed change.

The network partitioning problem described herein is that of determining what part of a network to re-analyze changes in as a result of changes in another part of the network. In addition or alternatively, embodiments may be utilized to determine one or more parts of the world's airline network that can be ignored in response to changes in any given sub-network. For example, in response to a long-distance non-stop flight being introduced in the Perth-London market (for which no such service now exists) some market changes are relatively easy to predict. More particularly, the addition of this service will change the available air travel itineraries for almost every market in Australia, due to the expected demand to shift from Sydney, and all the markets that use Sydney in one or more of its itineraries, to itineraries through Perth. Thus, the demand in these markets should be reallocated in response to the effects of the changes on itinerary use and airplane capacity requirements. Similarly, it is expected that changes in paths that go through London from Australia may also be reallocated in response to the addition of the non-stop Perth-London flight. However, it is not at all clear that any changes in market allocation in some other parts of the world, such as Arusha, Tanzania to Johannesburg, South Africa, would result from the addition of the non-stop Perth-London flight.

A tool called a Global Market Allocation System (GMAS) is configured to determine the details of the allocation of passengers to the world's network. This tool is used to understand the impact of the proposed fleet or schedule changes. Since execution time of the GMAS analysis is directly proportional to the number of markets being analyzed, eliminating markets that will not be affected by a given change from the analysis could save significant time and resources, and since there are over 300,000 markets in the current world network, that savings could be considerable.

The GMAS is configured to utilize an accumulative passenger utility, as measured by an empirically-calibrated stochastic utility model, to assess the value of an itinerary as it is being generated. The construction of a specific itinerary stops in response to the accumulated utility dropping below a predetermined minimum value. This predetermined minimum value is based upon, for example, an itinerary having so little utility that no passenger could be expected to select that itinerary, empirical data, and the like. This is called the passenger utility stopping rule. As a byproduct, the passenger utility stopping rule yields a useful specification of the additional markets that may be considered if changes are made in a given market. The general process for generating paths is configured to iteratively step down a tree-structure comparing destinations from each node in the tree to a search string. At each node, the algorithm is configured to determine if the destination of the market under study can be reached directly from that node, and if so, and if the utility stopping rule is not violated, that path is added to the itinerary list.

By taking the generation process another step forward the affected sub-networks may be partitioned from the rest of the global airline network. For example, if it determined that, from a specific node of the tree, it is not possible to reach the final destination directly, an artificial or 'perfect' flight leg may be introduced from that node to the destination. That is, a hypothetical path is generated from this node to the destination which has the least disutility possible (assuming fare does not change). The addition of the hypothetical path to the search creates a potential itinerary for the market. If the total utility of the path with this newly added hypothetical leg is sufficient to include the path in the list of viable itineraries (the generation stopping rule is not met), then such a node is referred to as a worthy airport. It is called that because, when a change is made to a given market network, only airports included in existing itineraries or included among the worthy airports for that market are candidates to be examined for changes—are worthy of consideration. If the total utility of the path with this newly added hypothetical leg is not sufficient to include the path in the list of viable itineraries (the generation stopping rule is met), then it can be assumed that no useful nodes exist beyond this node so, the search process is halted on this branch and the search is initiated on the next branch. As such when analyzing the effects of change on a given market, a relatively smaller subset of the market may be searched more quickly than the total market.

According to various embodiments, the GMAS is configured to creates itineraries utilizing an itinerary generation algorithm and/or the GMAS is configured to build a list of worthy airports for each market. For any specified set of markets in which changes are made to anything in the network structure—schedule, equipment, fare—only those airports in the collective worthy airport list may to be analyzed for the effects of the changes. Sometimes the worthy airport list is quite large (markets which include London, for example, have several thousand airports in the list), but in most cases it is only a few dozen, which substantially trims the extent of a market allocation analysis, and hence the time it takes to perform such an analysis. Application of the method in the analyses of network changes has reduced processing time an average of 80%, from a mean of about eight computing hours to less than 45 minutes.

FIG. 1 is a system diagram of a flight scheduling system 10 according an embodiment. As shown in FIG. 1, the flight scheduling system 10 includes a server 12. This server 12 is preferably a computing device such as a personal computer (PC), laptop, handheld, host computer, server, or the like. As such, the server 12 is operable to execute computer readable code, display information to a user and receive input from the user. In this regard, the flight scheduling system 10 includes a display 14 to display information to the user and an input device such as a keyboard 16 operable to receive input from the user. In addition, the flight scheduling system 10 may include any suitable pointing device such as a mouse or touch pad as well as any other suitable computer peripheral device. The server 12 is configured to communicate with any suitable device of the flight scheduling system 10. This attachment may be in the form of wired and/or wireless communication. To communicate with various components, the server 12 is preferably connected via a network 18. In a preferred form, the network 18 utilizes a standardized communication protocol such as Internet Protocol (IP) and/or the like. The network 18 may include a local area network (LAN), wide area network (WAN), wireless network, the Internet, and the like.

The flight scheduling system 10 may, optionally, include a multitude of additional components such as a database 20, memory 22, remote host 24, remote database 26, and the like. These and other components may be configured to intercommunicate with the server 12 in any suitable manner. For example, intercommunication may be performed via wires and/or in a wireless manner. In a particular example, the server 12 may communicate via a network such as the Internet 30. The keypad 16 is configured to provide the user the capability to forward instructions to the server 12. For example, the keypad 16 may include keys to input query parameters such as, origin city, destination city, maximum acceptable connecting flights, date and time of departure, number of passengers, seat position and class preferences, passenger identity, and the like. These and any other suitable information may be stored to a file 32. This file 32 may be generated in response to receiving query parameters and the information therein may be stored in the form of a table of entries, for example. A particular entry may include a passenger profile or query profile that includes some or all of the query parameter above. The server 12 is configured to process the query according to a code 34. The code 34 includes a list of executable instructions readable by the server 12.

The code 34 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Examples of computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Examples of computer readable signals, whether modulated using a carrier or not, are signals that a computer system hosting or running the computer program may be con figured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general. Also this query approach may be implemented in hardware including ASIC (application specific integrated circuit), custom accelerator logic, programmable logic controller (e.g. FPGA), etc.

The database 20, memory 22, and remote database 26 are configured to store information received from the server 12 and/or other components of the system 10. In a particular example, the database 20, memory 22, and remote database 26 are configured to store the file 32 and code 34. The database 20, memory 22, and remote database 26 may further provide this or other information to the server 12 and/or other components of the system 10. The database 20, memory 22, and remote database 26 may exist in a variety of forms such as, for example, random access memory (RAM), disk storage, electronic erasable programmable read only memory (EEPROM), and/or the like. The remote host 24 may, via the Internet 30 and/or the network 18, be configured to execute the code 34 or instruct the server 12 to execute the code 34.

In addition, at least the database 20 and remote database 26 are configured to store, forward, receive, and append information associated with a flight table 36. The flight table 36 includes information associated with some or all commercial flights. Examples of particular types of information includes origin and destination airports, departure times, arrival times, flight numbers, equipment or type of airplane, seat numbers, and the like. Furthermore, as described herein, at least the database 20 and remote database 26 are configured to store, forward, receive, and append information associated with a worthy origin-destination pair table 38. The worthy origin-destination pair table 38 may include data associated with origin-destination airport pairs that are potentially valuable to passengers and the air carriers that serve them.

Figure 2:
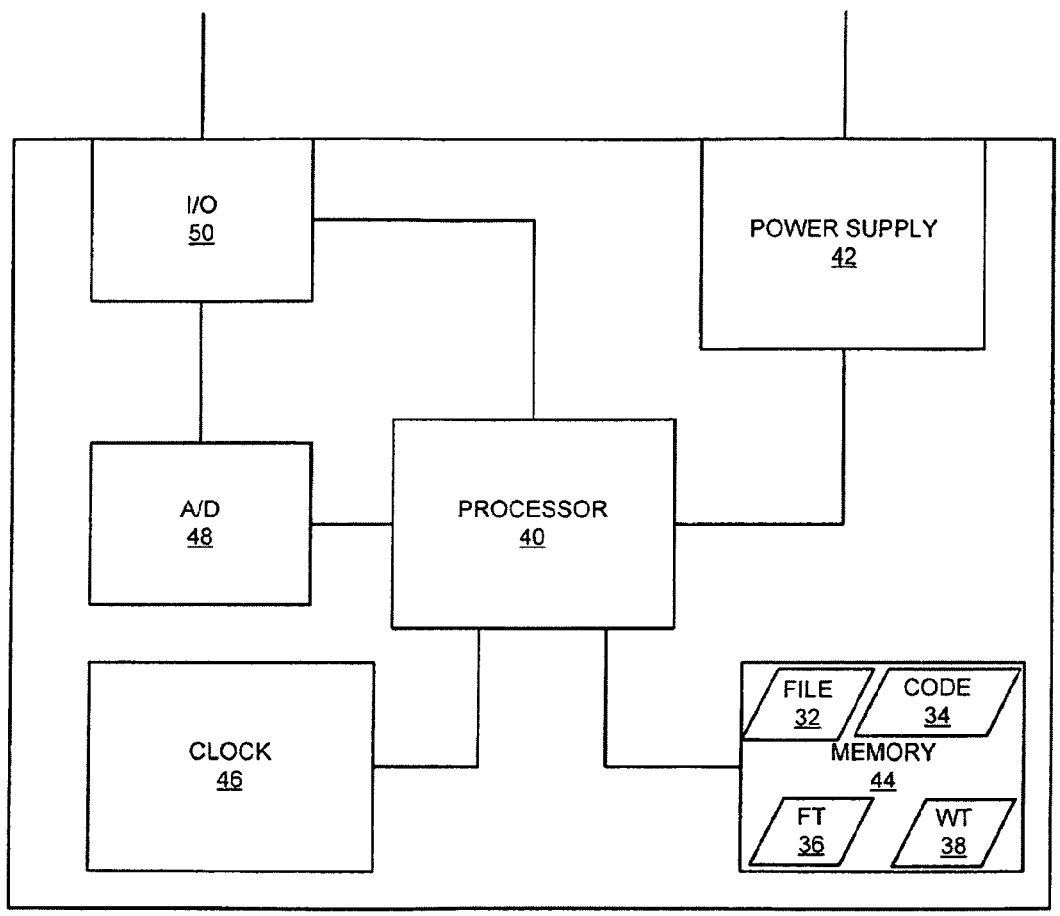
FIG. 2 is a block diagram of a system architecture for a server according to an embodiment of FIG. 1.

FIG. 2 is a system architecture for the server 12 suitable for use in the flight scheduling system 10 according to FIG. 1. As shown in FIG. 2, the server 12 includes a processor 40. This processor 40 is operably connected to a power supply 42, memory 44, clock 46, analog to digital converter (A/D) 48, and an input/output (I/O) port 50. The I/O port 50 is configured to receive signals from any suitably attached electronic device and forward these signals to the A/D 48 and/or the processor 40. For example, the I/O port 50 may receive signals associated with airline flights, origin, destination, date, time, passenger information, and the like and forward the signals to the processor 40. If the signals are in analog format, the signals may proceed via the A/D 48. In this regard, the A/D 48 is configured to receive analog format signals and convert these signals into corresponding digital format signals. Conversely, the A/D 48 is con figured to receive digital format signals from the processor 40, convert these signals to analog format, and forward the analog signals to the I/O port 50. In this manner, electronic devices configured to receive analog signals may intercommunicate with the processor 40.

The processor 40 is configured to receive and transmit signals to and from the A/D 48 and/or the I/O port 50. The processor 40 is further configured to receive time signals from the clock 46. In addition, the processor 40 is configured to store and retrieve electronic data to and from the memory 44. In a particular example, the processor 40 is configured to execute the code 34 and, according to the instructions in the code 34, receive query parameters and process queries. Furthermore, the processor 40 is configured to determine signals operable to modulate the display 14, a printing device, and/or the like and thereby output or display information associated with the query.

According to an embodiment, the processor 40 is configured to generate a list of potential flight itineraries for a passenger. Ideally, at least one potential flight itinerary will be suitable for the passenger. It is an advantage of embodiments of the disclosed system that the search or query to generate the list of potential flight itineraries is performed quickly and efficiently by reducing the amount of data searched. For example, flights outside the passenger's parameters may be discounted or otherwise removed from the flight table 36. In another example, the maximum number of stops in the flight as specified by the passenger may be utilized to reduce the dataset. That is, if it is not possible to get from point A to point B through point C within the maximum number of stops, then all flight departing from and arriving to point C are removed from the dataset. It is another advantage of embodiments of the disclosed system that worthy or high-value origin-destination pairs are evaluated and/or identified and stored to the worthy origin-destination pair table 38. In a simplified example, if the list of potential flight itineraries only includes sub-optimal listings, a hypothetical flight path is generated and evaluated. If it is determined that the hypothetical flight path is valuable, the hypothetical flight path is stored to the worthy origin-destination pair table 38.

Consider is the problem of itinerary or path generation. This is the process by which the paths that are available to the passengers in a given city pair market are determined. The issue of path generation arises because schedule sources such as the OAG (Official Airline Guide) do not describe all the possible ways of getting from an origin to a destination. In particular, interline connections—those requiring a change of carriers—aren't generally recorded by schedule services because of the alliance relationships between carriers which, in turn, dictate preferred connections that may not meet optimal passenger requirements. Thus, in order to understand the options open to passengers for booking, and subsequently to accurately portray the loads on alternative paths between an origin and destination, there is a means for taking a reported schedule, as produced from the OAG other source and turn it into a full set of possible paths between any two cities in the network of interest. Due to the degree of interconnections within the airline network the number of possible paths between an origin-destination is extremely large. For example, there are many thousands of possible flight itineraries from Seattle to New York within the airline network. However, many of them are counterproductive. For example, an itinerary from Seattle to New York by way of Warsaw, Poland may be possible even if it is counterproductive.

Figure 3:
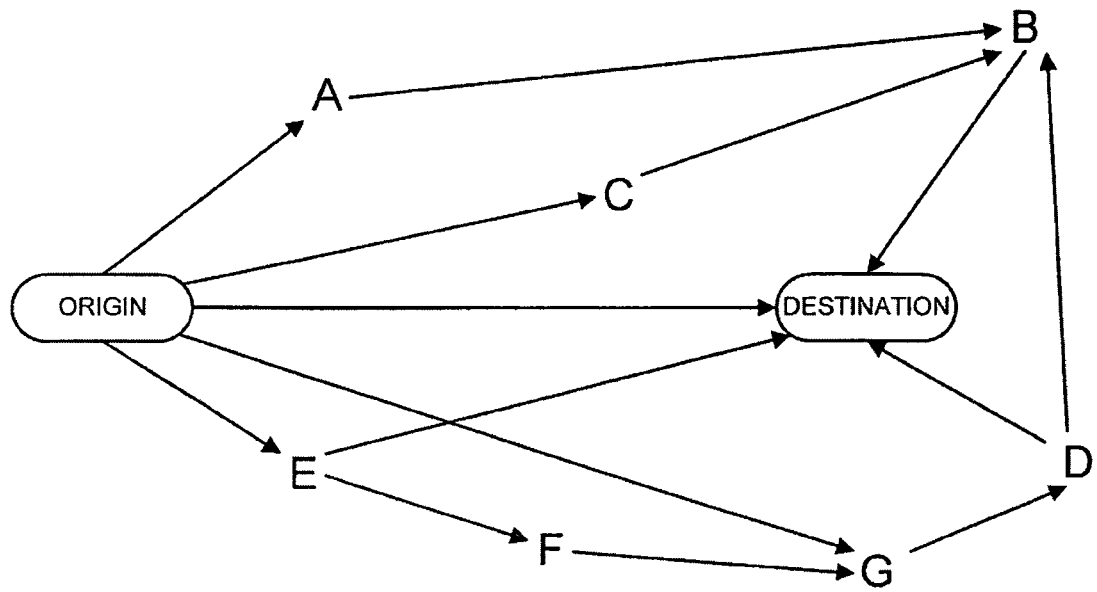
FIG. 3 is a network topology according to an embodiment of FIG. 1
Figure 4:
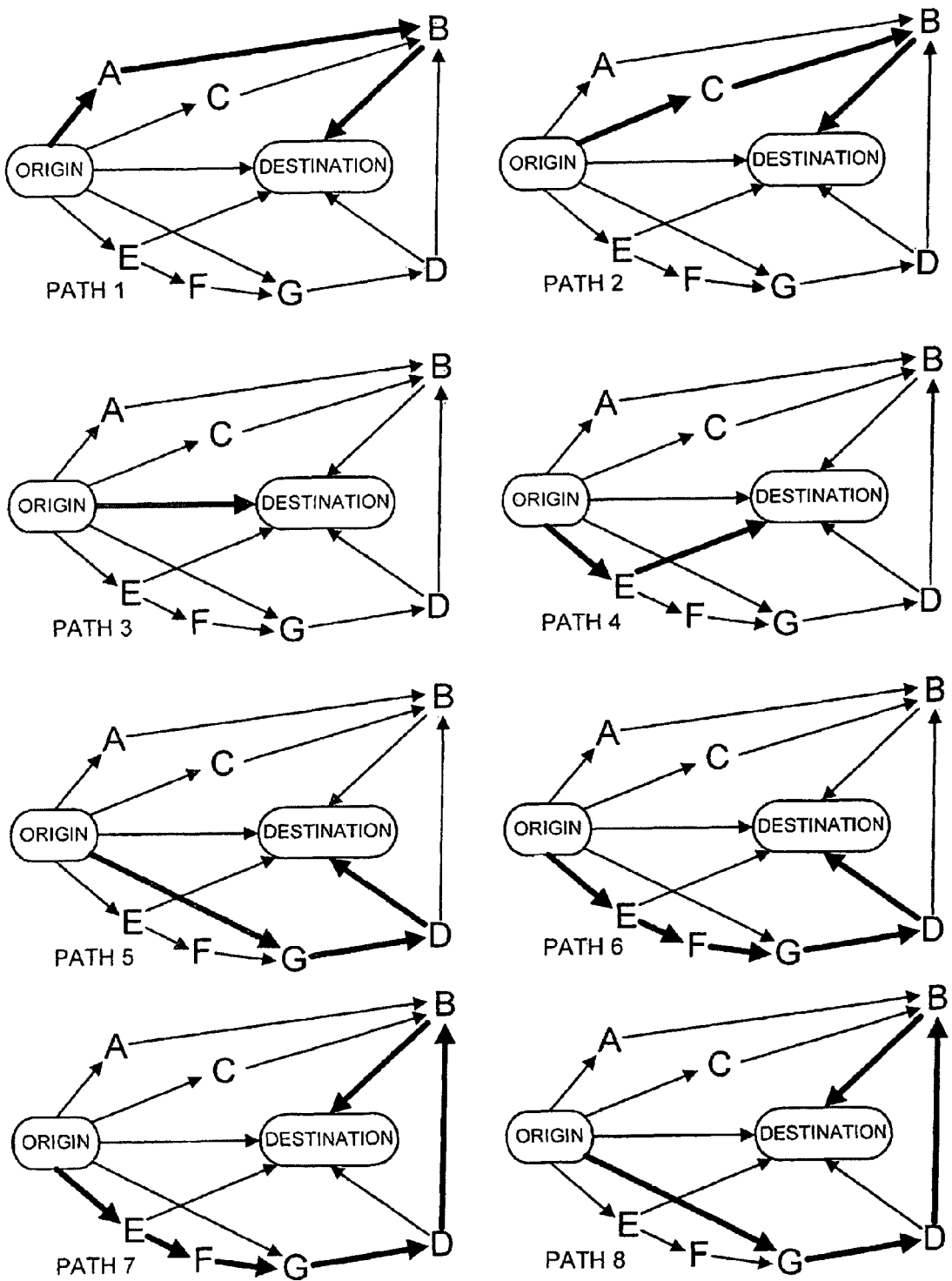
FIG. 4 is a set of eight potential paths in a network topology according to FIG. 3.
Figure 5:
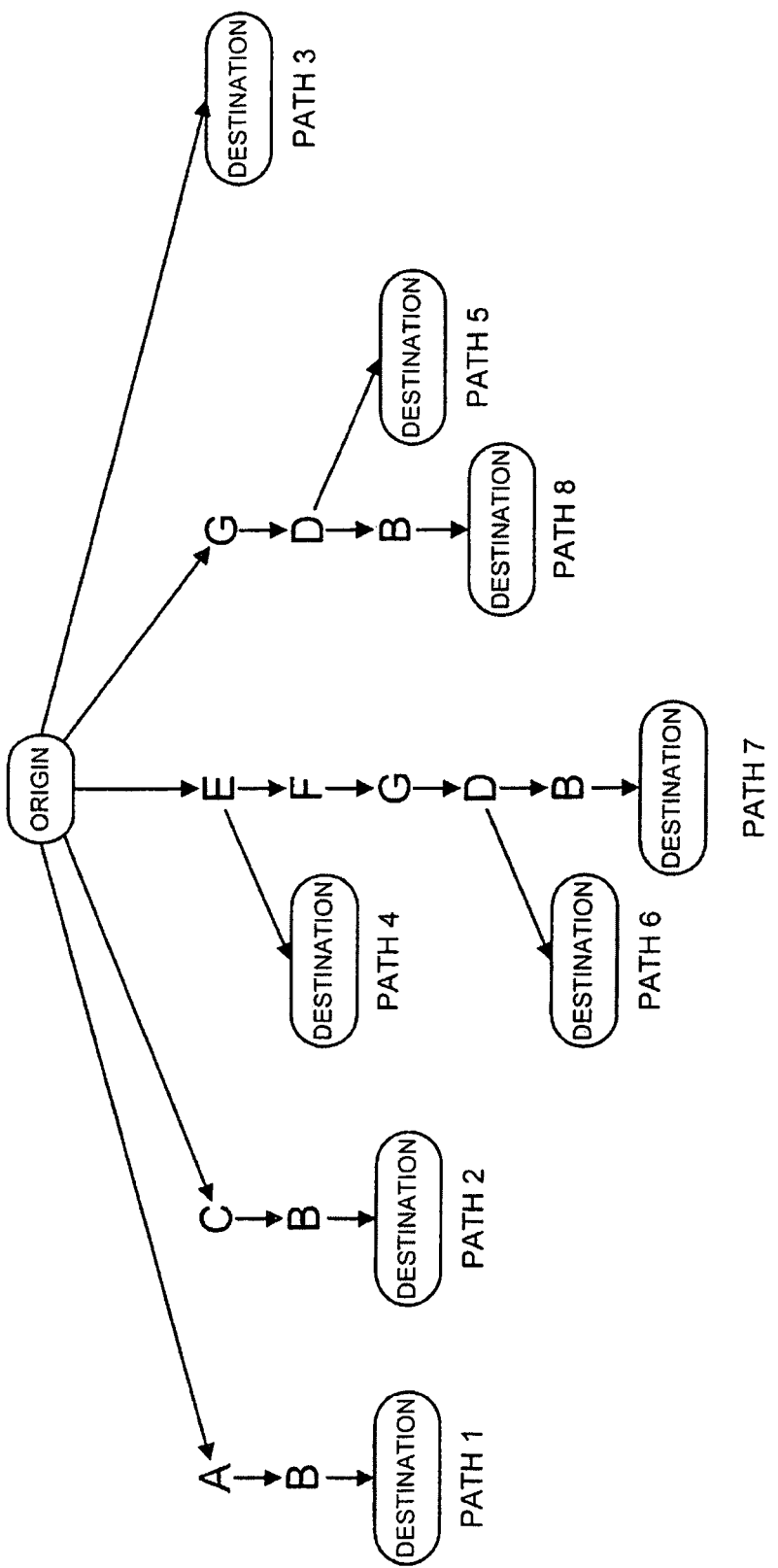
FIG. 5 is an itinerary tree structure according to an embodiment of FIG. 1.

To reduce or eliminate such a sub-optimal or counterproductive connection from consideration, a stopping rule is utilized to stop the iterative searching of low utility branches of the network topology. The stopping rule includes one or more predetermined values that, if exceeded, halt the search process on the current branch so that another branch may be searched. These predetermined values may pertain to the number of connecting flights, duration of layovers, and the like. If it is determined that there is no optimal existing path, a hypothetical 'optimal' path may be generated. In an embodiment, the optimal path generation process may be broken down into two phases: 1) the creation of a potential connection; and 2) evaluation of the hypothetical path for "reasonableness" encompassed in the stopping rule. By way of example, consider the network topology described by FIG. 3 and FIG. 4. In this case, there are eight ways of getting from the origin to the destination. Path 3 is a direct non-stop path, whereas path 7 makes five stops on a quite circuitous route. One way of generating paths is the so called "depth-first" search illustrated in FIG. 5. In this approach, each possible path is described as the branch of an inverted tree, and is generated as follows: a) from the origin, put all the possible non-stop destinations in some order; b) go to the first non-stop destination, and if this destination is the final destination, then a valid path has been found, record the valid path, and go to the next. This process is continued in this way until all branches of the tree are explored, recording all the itineraries that connect the origin and destination and ignoring all the rest. A pseudocode description of the generation algorithm is as follows:

```
Load all destinations available from origin
  For each destination {
    Order all flights out of origin by passenger utility
    Is final destination among destinations?
      Yes: Record path; next destination
      Hit stopping rule?
        Yes: Next destination
        No: {
          Load all 2nd order destinations from this destination
          For each 2nd order destination {
            Order 2nd order flights by passenger utility
            If final destination among 2nd order destinations?
              Yes: Record path; next destination
              Hit stopping rule?
                Yes: Next 2nd order destination
                No: {
                  Repeat for 3rd, 4th etc. order destinations until
                    there are no more}
                Next 2nd order destination
          }
    Next destination
  }
```

This algorithm is configured to generate paths that will meet the stopping rule criterion. If the stopping rule is overly restrictive, potentially valuable itineraries may be overlooked. For example, if the stopping rule only allows direct flights, many valuable one and two stop flights will be overlooked. However, if the stopping rule is very generous, allowing most paths, and the network is large, then the execution time may become burdensomely long to compute.

In an embodiment, the stopping rule is based upon passenger utility. However, other stopping rules may be suitable with this and other embodiments. Essentially, the stopping rule is configured to stop searching a particular branch of the network in response to the utility of the resulting itinerary falling below what the passenger may be expected to select. These expectations may be based upon empirical data and/or historical records of passenger selections. In addition, the utility of an itinerary or path may be calculated using a utility function One such utility function is given by the formula $$V(j) = \phi_f \ln f_j + \phi_d d_j + \phi_{bd} d_j \ln d_b + \phi_s s_j + \phi_{1st} X_{1st,j} + \phi_{ec,j} X_{ec,j} + \phi_{mo} X_{mo,j} + \phi_{eo,j} X_{eo,j} + \phi_{md,j} X_{md,j} + \phi_{ed,j} X_{ed,j} \quad \text{Eqn. 1}$$

where j is the path index, $f_j$ the fare of path j, $d_j$ the duration (travel time) of the path j, $d_b$ the duration of a non-stop path (base duration), $s_j$ the number of stops on path j, $X_{1st,j}$ and $X_{ec,j}$ the indicator variables for the first and economy class cabins, and $X_{ma,j}$, $X_{ea,j}$, $K_{md,j}$ and $X_{ed,j}$ are indicator variables denoting morning arrival, evening arrival, morning departure and evening departure, respectively. The $\phi$ coefficients are empirical parameters.

Given an arbitrary path, such as path j, when the path j is compared to a "perfect" path, denoted ρ, which is a non-stop leaving and arriving at times which yield the highest utility as defined by $V^L(\rho)$, then we have, by the definition, of a logic model $$Pr[j, \rho] = \frac{e^{V(j)}}{e^{V(\rho)} + e^{V(j)}} = \frac{1}{1 + e^{V(\rho)-V(j)}} \quad \text{Eqn. 2}$$

where $Pr[j,\rho]$ is the probability of choosing flight j over the non-stop $\rho$.

A reasonable stopping rule is to eliminate one or more paths for which the probability of a passenger choosing it falls below a predetermined low value. Specifically, the predetermined low value may be configured to reduce or eliminate paths for which the expected passenger demand is less than one. Thus, if N is the number of passengers that want to go from the origin to the destination under study—the expected demand—then the rule is "Eliminate path j such that $Pr[j,\rho]$ is less than $1/N$." Thus we have $$Pr[j, \rho] = \frac{1}{1 + e^{V(\rho)-V(j)}} < \frac{1}{N} \quad \text{Eqn. 3}$$
$$\Rightarrow 1 + e^{V(\rho)-V(j)} > N$$
$$\Rightarrow V(\rho) - V(j) > \ln(N-1)$$

(The symbol $\Rightarrow$ is read "implies.") To make the notation easier as the argument progresses, define the function $Q(\rho,j)$ as the difference between the utility of $\rho$ and the utility of j:

$$\begin{aligned} Q(\rho, j) &\equiv V(\rho) - V(j) \quad \text{Eqn. 4}\\ &= \beta_f \ln(f_\rho - f_j) + \beta_d(d_\rho - d_j) + \beta_{bd}\ln d_b(d_\rho - d_j) +\\ &\quad \beta_s(s_\rho - s_j) + \beta_{mo}(X_{mo,\rho} - X_{mo,j}) +\\ &\quad \beta_{eo}(X_{eo,\rho} - X_{eo,j}) + \beta_{md}(X_{md,\rho} - X_{md,j}) +\\ &\quad \beta_{ed,j}(X_{ed,\rho} - X_{ed,j}). \end{aligned}$$

Then a path is eliminated if $$Q(\rho,j) > \ln(N-1). \quad \text{Eqn. 5}$$

In another example, a "most useful path" approach may facilitate a dramatic reduction in the number of paths to be considered for demand allocation. Let $\Psi$ be the set of paths for an origin-destination created by the stopping rule. The probability of each path in $\Psi$ is calculated considering all the other connecting paths in $\Psi$. That is, rather than compare path j to a theoretical perfect non-stop $\rho$, the probability of an arbitrary path $\psi \in \Psi$ is compared to all the other connections in $\Psi$ using the general passenger choice probability of $$p_\psi \equiv Pr[\psi] = \frac{e^{V(\psi)}}{\sum_{\theta \in \Psi} e^{V(\theta)}}. \quad \text{Eqn. 6}$$

The paths in $\Psi$ are ordered from high to low according to $p_\psi$. In a particular example, the highest probability is denoted by $p_1$, then next by $p_2$, etc., so the ordering is such that $$p_1 \geq p_2 \geq \ldots \geq p_{E(\Psi)}. \quad \text{Eqn. 7}$$

The expected number of passengers that would fly on path $\psi$ is represented by $Np_\psi$. Therefore, by discounting paths having a value of p where Np first falls below 1, paths that can be expected to have no passengers may be eliminated from $\Psi$. However, by removing a path from $\Psi$ changes the probability $p_\psi$, for every $\psi$ remaining in $\Psi$. (In fact, the probabilities of the remaining paths are increased slightly.) Accordingly, the set of itineraries which has the fewest number of paths with expected demand less than 1 may be calculated using the following algorithm:

Order the paths in $\Psi$ as described above.

Consider the first two paths $p_1$ and $p_2$, define $\Psi=\{1, 2\}$, containing exactly these two paths, and compute the probability of each, as $$p_1 = \frac{e^{V(1)}}{e^{V(1)} + e^{V(2)}}, \quad \text{Eqn. 8}$$
$$p_2 = \frac{e^{V(2)}}{e^{V(1)} + e^{V(2)}}.$$

where V(k) is the utility of path k.

If $Np_2 < 1$ then stop, otherwise continue.

Add the next path in order to the set, and re-compute the probabilities of each path in the new set. That is, add path k to $\Psi$, so $\Psi=\{1, 2, \ldots k\}$, and calculate $$p_1 = e^{V(1)} \bigg/ \sum_{i=1}^{k} e^{V(i)}, \quad \text{Eqn. 9}$$
$$p_2 = e^{V(2)} \bigg/ \sum_{i=1}^{k} e^{V(i)},$$
$$\vdots$$
$$p_k = e^{V(k)} \bigg/ \sum_{i=1}^{k} e^{V(i)}.$$

If $Np_k < 1$, then stop. Otherwise repeat.

The passenger utility stopping rule yields, as a byproduct, a useful specification of the additional markets that may be considered if changes are made in a given market. That is, the passenger utility stopping rule may be utilized to generate a partitioning of the network into two parts: 1) a part affected by changes and therefore may be re-analyzed; and 2) a part substantially unaffected by changes and therefore that can be ignored. To generate paths, a computer processor is configured to parse through a tree-structure of the airline network comparing destinations from each node in the tree to one or more search criteria. For example, at each node, the processor is configured to execute the algorithm to determine if the destination can be reached directly from that node, and if so, and if the utility stopping rule is not violated, the processor is configured to add the path to the itinerary list.

In an embodiment, one or more particular markets may be separated from the rest of the network. For example, if a search from a specific node 'Q' does not yield a path to the final destination, a hypothetical leg having the least disutility possible is generated. The total utility of the path with the hypothetical leg is greater than the total utility of the path with any subsequent nodes beyond node Q. As such, the total utility of the path with the hypothetical leg may be compared to a list of useful paths. If the total utility of the path with its hypothetical leg is not sufficient to be included in the most useful path list, then all subsequent nodes beyond the node Q may be discounted or separated from the rest of the network. However, if the total utility of the path with its hypothetical leg is sufficient to be included in the most useful path list, then a subsequent node beyond the node Q may be yield a useful path and the hypothetical leg represents a potentially high-value leg. Therefore, this node may be stored to a 'worthy airport' list for considering future expansion of the network.

It is an advantage of this embodiment that, in response to a change in a given market's network, the set of airports analyzed in response to changes in the network may be reduced to airports included in existing paths and those included among the worthy airports. That is, only a relatively small subset of nodes may be consider when analyzing the effects of change on a given market—greatly speeding the analysis time.

As such, it is advantage of various embodiments that, while creating paths using the path generation algorithm, a list of worthy airports is generated for each market. In response to suitable changes in a specified set of markets, this reduced set of worthy airports may be quickly analyzed for the effects of these changes in the markets. Examples of changes that may effect the markets includes schedule, equipment, fare, etc.

The pseudocode algorithm for path generation described earlier then becomes as follows:

```
Load all destination nodes available from origin
    For each node {
        Order all flights out of origin by passenger utility
        Is final destination among nodes?
            Yes: Record path; next node
            No: Will perfect nonstop from this node hit stopping rule?
                Yes: {
                    Record node as worthy airport for this market
                    Next destination
                }
                No: {
                    Load all 2nd order nodes from this destination
                    For each 2nd order node {
                        Order 2nd order flights by passenger utility
                        If final destination among 2nd order nodes?
                            Yes: Record path; next destination
                            No: Will perfect nonstop hit stopping rule
                                Yes {
                                    Record node as worthy airport
                                    Next 2nd order node
                                }
                                No: {
                                    Repeat for 3rd, 4th etc. order destinations until
                                        there are no more}
                                    Next 2nd order node
                                }
                        }
                    Next node
                }
    }
```

Figure 6:
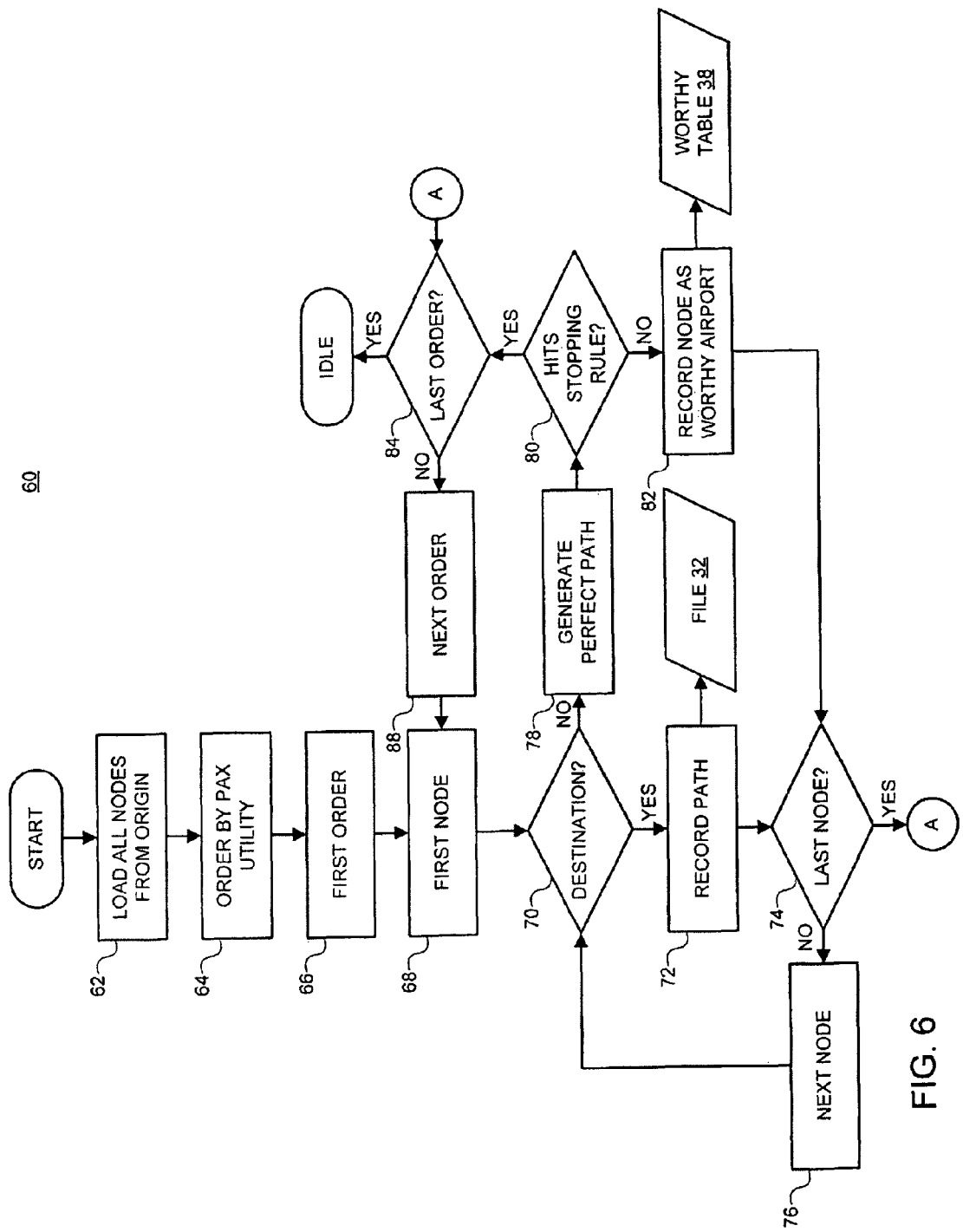
FIG. 6 is a flow diagram of a method illustrating the steps that may be followed in accordance with an embodiment.

A flow chart for this algorithm is shown in FIG. 6.

The many features and advantages of the various embodiments are apparent from the detailed specification, and thus, it is intended by the appended claims to cover all such features and advantages that fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the various embodiments.

What is claimed is:

1. A computer-implemented method of partitioning a global network into a sub-network performed on a processor that includes a non-transitory memory device, the sub-network representing a reduced dataset of potential itineraries in a hierarchical database, the method comprising:

analyzing a global network of nodes to assess the passenger utility of existing paths between origin-destination pairs of airports within the global network by performing the following steps for each node in the global network:

loading a set of nodes for an origin;

comparing a first node of the set of nodes to a destination, wherein the first node includes a first branching structure of subsequent nodes in the hierarchical database;

storing, if the first node is the destination, an existing path to a file;

generating, if the first node is not the destination, a new hypothetical leg connecting the first node directly to the destination to form a new hypothetical path from the origin to the destination, wherein the new hypothetical leg is not currently stored in the database and is not currently a leg between the origin and the destination;

comparing the new hypothetical path to a stopping rule;

storing the new hypothetical path to a reduced dataset and adding the first node to a list of worthy nodes if the utility of the new hypothetical path exceeds a predetermined low value; and stopping the analysis of subsequent nodes in the first branching structure if the utility of the new hypothetical path is less than the predetermined low value;

in the event of a change to the global network, analyzing a sub-network of the global network for an effect of the change on the passenger utility of origin-destination pairs within the sub-network, the sub-network to be analyzed containing only nodes that are included in existing paths of the sub-network and nodes that are included among the list of worthy nodes, wherein the change comprises a change in equipment, schedule, or fare.

2. The method according to claim 1, further comprising:

loading a set of $2^{nd}$ order nodes for the first node;

comparing a first $2^{nd}$ order node of the set of $2^{nd}$ order nodes to the destination, wherein the first $2^{nd}$ order node includes a first $2^{nd}$ order branching structure of subsequent nodes in the hierarchical database;

storing, if the $2^{nd}$ order node is the destination, a $2^{nd}$ order existing path to the file;

generating, if the $2^{nd}$ order node is not the destination, a new hypothetical leg connecting the $2^{nd}$ order node to the destination to form a new $2^{nd}$ order hypothetical path from the origin to the destination wherein the new hypothetical leg is not currently stored in the database and is not currently a leg between the origin and the destination;

determining a utility of the new $2^{nd}$ order hypothetical path;

comparing the utility of the new $2^{nd}$ order hypothetical path to the predetermined low value;

storing the new $2^{nd}$ order hypothetical path to the reduced dataset and adding the $2^{nd}$ order node to a list of worthy nodes if the utility of the new $2^{d}$ order hypothetical path exceeds the predetermined low value; and stopping the analysis of subsequent nodes of the first $2^{nd}$ order branching structure if the utility of the new $2^{nd}$ order hypothetical path is less than the predetermined low value.

3. The method according to claim 1, wherein the stopping rule includes a predetermined low passenger utility value and the method further comprises:

determining a utility of the hypothetical path;

comparing the utility of the hypothetical path to the predetermined low passenger utility value;

storing the hypothetical path to the reduced dataset in response to the utility of the hypothetical path exceeding the predetermined low passenger utility value; and stopping analysis of subsequent nodes of the first branching structure in response to the utility of the hypothetical path being less than the predetermined low passenger utility value.

4. The method according to claim 1, wherein the stopping rule includes a predetermined high number of connecting flights and the method further comprises:
   determining a number of connecting flights for the hypothetical path;
   comparing the number of connecting flights for the hypothetical path to the predetermined high number of connecting flights;
   storing the hypothetical path to the reduced dataset in response to the number of connecting flights for the hypothetical path being less than the predetermined high number of connecting flights; and
   stopping analysis of subsequent nodes of the first branching structure in response to the number of connecting flights for the hypothetical path exceeding the predetermined high number of connecting flights.

5. The method according to claim 1, wherein the stopping rule includes a predetermined high duration of layovers value and the method further comprises:
   determining a layover duration for the hypothetical path;
   comparing the layover duration for the hypothetical path to the predetermined high duration of layovers value;
   storing the hypothetical path to the reduced dataset in response to the layover duration for the hypothetical path being less than the predetermined high duration of layovers value; and
   stopping analysis of subsequent nodes of the first branching structure in response to the layover duration for the hypothetical path exceeding the predetermined high duration of layovers value.

6. An apparatus for partitioning a global network into a sub-network, the sub-network representing a reduced dataset of potential itineraries in a hierarchical database, the apparatus comprising:
   means for analyzing a global network of nodes to assess the passenger utility of existing paths between origin-destination pairs of airports within the global network, including:
      means for loading a set of nodes for an origin;
      means for comparing a first node of the set of nodes to a destination, wherein the first node includes a first branching structure of subsequent nodes in the hierarchical database;
      means for storing, if the first node is the destination, an existing path to a file;
      means for generating, if the first node is not the destination, a new hypothetical leg directly connecting the first node to the destination to form a new hypothetical path from the origin to the destination, wherein the new hypothetical leg is not currently stored in the database and is not currently a leg between the origin and the destination;
      means for comparing the new hypothetical path to a stopping rule;
      means for storing the new hypothetical path to a reduced dataset and adding the first node to a list of worthy nodes if the utility of the new hypothetical path exceeds a predetermined low value; and
      stopping the analysis of subsequent nodes in the first branching structure if the utility of the new hypothetical path is less than the predetermined low value;
   means for analyzing, in the event of a change to the global network, a sub-network of the global network for an effect of the change on the passenger utility of origin-destination pairs within the sub-network, the sub-network to be analyzed containing only nodes that are included in existing paths of the sub-network and nodes that are included among the list of worthy nodes, wherein the change comprises a change in equipment, schedule, or fare.

7. The apparatus according to claim 6, further comprising:
   means for loading a set of $2^{nd}$ order nodes for the first node;
   means for comparing a first $2^{nd}$ order node of the set of $2^{nd}$ order nodes to the destination, wherein the first $2^{nd}$ order node includes a first $2^{nd}$ order branching structure of subsequent nodes in the hierarchical database;
   means for storing, if the $2^{nd}$ order node is the destination, a $2^d$ order existing path to the file;
   means for generating, if the $2^{nd}$ order node is not the destination, a new hypothetical leg connecting the $2^{nd}$ order node to the destination to form a new $2^{nd}$ order hypothetical path from the origin to the destination wherein the new hypothetical leg is not currently stored in the database and is not currently a leg between the origin and the destination;
   means for determining a utility of the new $2^{nd}$ order hypothetical path;
   means for comparing the utility of the new $2^{nd}$ order hypothetical path to the predetermined low value;
   means for storing the new $2^{nd}$ order hypothetical path to the reduced dataset and adding the $2^{nd}$ order node to a list of worthy nodes if the utility of the new $2^{nd}$ order hypothetical path exceeds the predetermined low value; and
   means for stopping the analysis of subsequent nodes of the first $2^{nd}$ order branching structure if the utility of the new $2^{nd}$ order hypothetical path is less than the predetermined low value.

8. The apparatus according to claim 6, wherein the stopping rule includes a predetermined low passenger utility value and the apparatus further comprises:
   means for determining a utility of the hypothetical path;
   means for comparing the utility of the hypothetical path to the predetermined low passenger utility value;
   means for storing the hypothetical path to the reduced dataset in response to the utility of the hypothetical path exceeding the predetermined low passenger utility value; and
   means for stopping analysis of subsequent nodes of the first branching structure in response to the utility of the hypothetical path being less than the predetermined low passenger utility value.

9. The apparatus according to claim 6, wherein the stopping rule includes a predetermined high number of connecting flights and the apparatus further comprises:
   means for determining a number of connecting flights for the hypothetical path;
   means for comparing the number of connecting flights for the hypothetical path to the predetermined high number of connecting flights;
   means for storing the hypothetical path to the reduced dataset in response to the number of connecting flights for the hypothetical path being less than the predetermined high number of connecting flights; and
   means for stopping analysis of subsequent nodes of the first branching structure in response to the number of connecting flights for the hypothetical path exceeding the predetermined high number of connecting flights.

10. The apparatus according to claim 6, wherein the stopping rule includes a predetermined high duration of layovers value and the apparatus further comprises:

means for determining a layover duration for the hypothetical path;
means for comparing the layover duration for the hypothetical path to the predetermined high duration of layovers value;
means for storing the hypothetical path to the reduced dataset in response to the layover duration for the hypothetical path being less than the predetermined high duration of layovers value; and
means for stopping analysis of subsequent nodes of the first branching structure in response to the layover duration for the hypothetical path exceeding the predetermined high duration of layovers value.

\* \* \* \* \*